(12) United States Patent
McDowell

(10) Patent No.: US 6,575,796 B1
(45) Date of Patent: Jun. 10, 2003

(54) AMPHIBIOUS VEHICLE DRIVE TRAIN

(75) Inventor: Robert Flint McDowell, Branson, MO (US)

(73) Assignee: Ozarks Scenic Tours, Inc., Branson, MO (US)

(*) Notice: Subject to any disclaimer, the term of this patent is extended or adjusted under 35 U.S.C. 154(b) by 0 days.

(21) Appl. No.: 09/596,496

(22) Filed: Jun. 19, 2000

(51) Int. Cl.$^7$ ................................................. B60F 3/00
(52) U.S. Cl. .................................. 440/12.57; 440/12.51
(58) Field of Search ........................... 440/12.5, 12.51, 440/12.57, 12.59, 12.66; 114/145 R, 61.26; 180/336; 74/473 R, 480 B

(56) References Cited

U.S. PATENT DOCUMENTS

| | | | | |
|---|---|---|---|---|
| 1,135,126 A | | 4/1915 | Mazzei | |
| 1,408,899 A | * | 3/1922 | Marple | 440/12.5 |
| 1,420,783 A | | 6/1922 | Swencki | |
| 1,550,344 A | * | 8/1925 | Copes | 440/12.57 |
| 1,759,280 A | * | 5/1930 | Romaniuk | 440/12.51 |
| 2,330,958 A | * | 10/1943 | Danforth | 440/12.57 |
| 2,341,165 A | * | 2/1944 | Todd | 440/88 |
| 2,400,132 A | * | 5/1946 | Porter | 440/12.59 |
| 3,114,347 A | * | 12/1963 | Trippel | 440/12.59 |
| 3,176,585 A | * | 4/1965 | Ruf | 89/36.08 |
| 3,486,477 A | * | 12/1969 | Pender | 440/12.53 |
| 4,257,505 A | * | 3/1981 | Stodt | 192/18 A |
| 4,607,562 A | * | 8/1986 | LeBlanc | 89/40.03 |
| 4,712,636 A | | 12/1987 | Ishimatsu | |
| 4,838,194 A | * | 6/1989 | Williamson | 440/12.53 |
| 5,315,950 A | | 5/1994 | Abel | |
| 5,392,871 A | | 2/1995 | McFarland | |
| 5,562,066 A | | 10/1996 | Gere et al. | |
| 5,769,676 A | | 6/1998 | Ortiz-Flotats | |
| 5,993,273 A | | 11/1999 | Adams | |

FOREIGN PATENT DOCUMENTS

| | | | | |
|---|---|---|---|---|
| AU | 120859 | * | 2/1947 | 440/12.66 |
| DE | 1179130 | * | 10/1964 | 440/12.51 |
| DE | 3916200 | * | 11/1990 | 440/12.5 |
| GB | 15078 | * | of 1907 | 440/12.57 |
| GB | 292377 | * | 7/1920 | 440/12.5 |
| GB | 332519 | * | 7/1930 | 440/12.5 |
| GB | 942849 | * | 11/1963 | 440/12.59 |
| GB | 1055757 | * | 1/1967 | 440/12.6 |
| JP | 63-93607 | * | 4/1988 | 440/12.5 |
| JP | 63-93608 | * | 4/1988 | 440/12.5 |
| JP | 63-93609 | * | 4/1988 | 440/12.5 |
| JP | 4-63709 | * | 2/1992 | 440/12.5 |

* cited by examiner

Primary Examiner—S. Joseph Morano
Assistant Examiner—Ajay Vasudeva
(74) Attorney, Agent, or Firm—Shook, Hardy & Bacon L.L.P.

(57) ABSTRACT

A drive train for an amphibious vehicle provided with a propellor disengaging mechanism aft of the transfer case, thus allowing the output drive shafts to be continuously driven at all times. The drive train includes a motor attached to a transmission which is attached to a transfer case. The attachments are accomplished by rotatably coupled drive shafts. The drive train transfers rotational movement from the motor to the transmission, then to a transfer case where it is output to the various drive shafts enabling the vehicle to be propelled on land and in water.

12 Claims, 2 Drawing Sheets

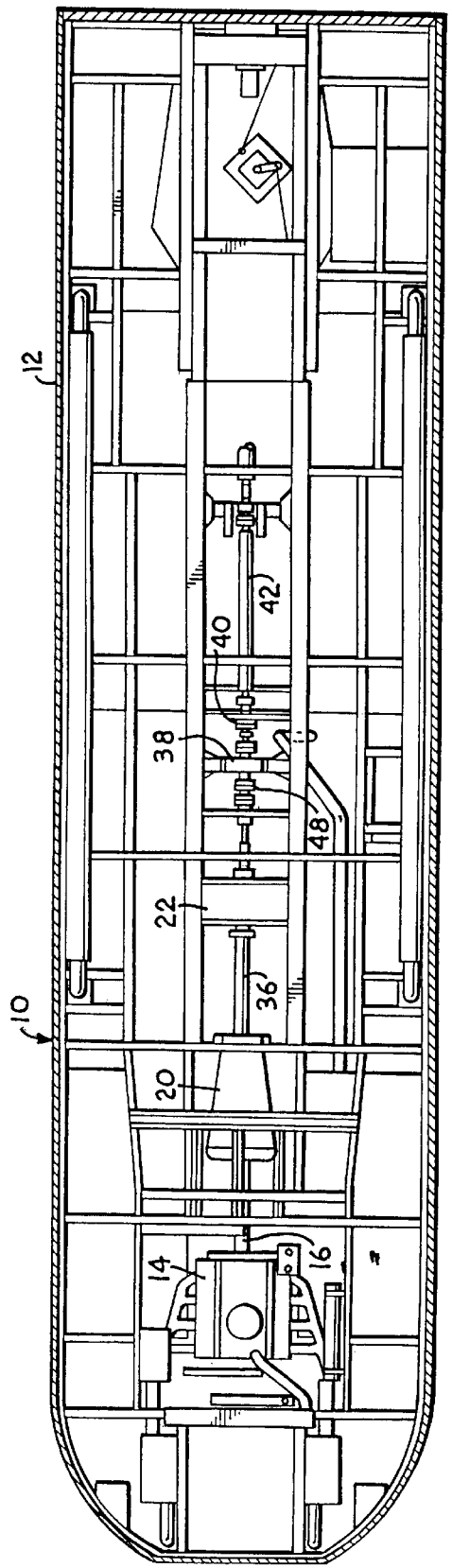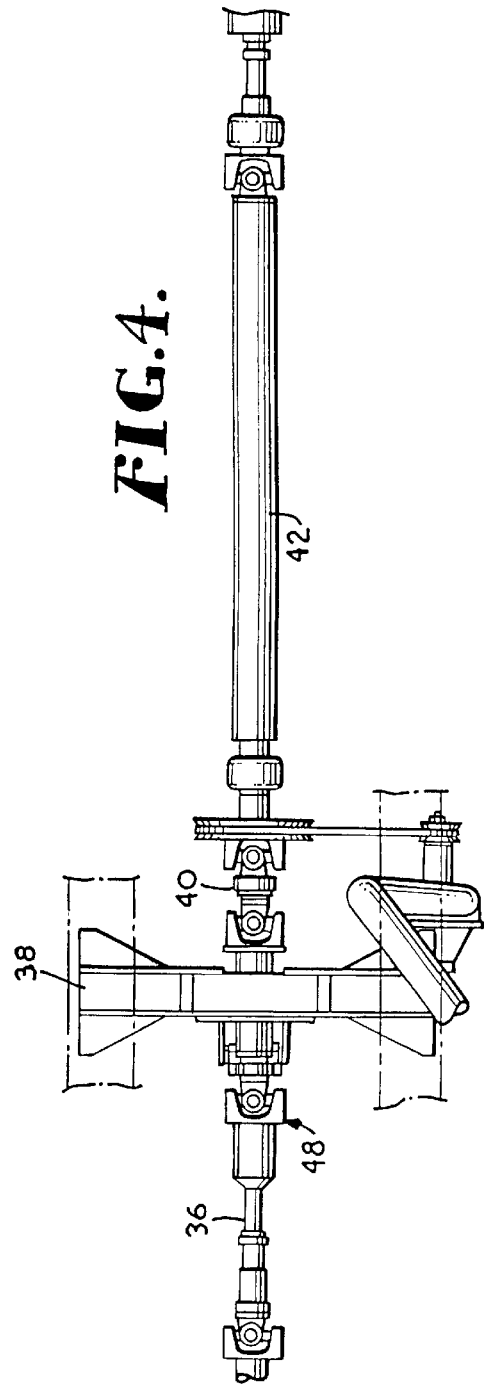

AMPHIBIOUS VEHICLE DRIVE TRAIN

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention relates to a drive train for an amphibious vehicle and, more particularly, to a drive train where all of the drive shafts are continuously rotating and a propellor engaging mechanism exists aft of the transfer case for engaging and disengaging the propellor.

Amphibious vehicles present unique design challenges. Unlike cars and trucks, which are designed specifically to be driven on the land, and boats, which are designed specifically to be driven in water, amphibious vehicles must be designed to handle both tasks equally well. When driven on land, the body of an amphibious vehicle must drive like an ordinary road vehicle. On the other hand, when the amphibious vehicle is propelled in water, the vehicle must have the ability to maneuver like a boat. Therefore, the vehicle has to be provided with a propulsion system which drives both on land and in water.

In the past, a dual propulsion system was achieved by using a switching mechanism on the transfer case to allow the drive system to be used either for land or water. The switch allowed the propulsion system to drive the boat on land as well as in water, but had to be switched between the two. This type of arrangement needed a complex transfer case and switching mechanism to allow for transformation between the two. One such complex transfer case can be found in U.S. Pat. No. 5,562,066.

Another dual propulsion system was achieved by adding a small, two-speed transfer case between the primary transfer case and the transmission. This allowed the propellor to be driven off one shaft and the other shaft run to a second transfer case where it was then directed to the driving wheels. However, due to the short distance available between the rear of the transmission and the front of the main transfer case, it is difficult, if not impossible, to place any new or larger components in this limited space. The additional gearbox was located in this region of limited space and thus two very short drive shafts were provided. This configuration is very cramped and does not allow use of the very large truck-style automatic transmissions that are needed to transfer power of the large engines that are employed. More specifically, due to limited area between the transfer case and the automatic transmission, there is not enough room for the additional gear box and the large truck-style automatic transmissions and thus, the present invention arose.

BRIEF SUMMARY OF THE INVENTION

Accordingly, it is an object of this invention to provide a simple amphibious propulsion system which operates both amphibious and ground drives wherein a simple transfer case can be utilized without any complex switch to select between land use or marine use.

Another object of this invention is to provide an amphibious propulsion system consisting of only one transfer case whose outputs continuously drive both the land and marine functions.

Another object of this invention is to provide a disengaging mechanism for the propellor located aft of the transfer case to allow the propellor shaft to be disengaged when not in use.

A still further object of this invention is to position the components of the drive train rearwardly to add further balance to the vehicle.

Accordingly, the present invention provides for a simple amphibious propulsion system including a drive train which is capable of propelling the vehicle on land and in water. The drive train comprises a motor rotatably coupled to a transmission via a drive shaft. The transmission is then rotatably coupled to a transfer case using another drive shaft. Each output drive shaft of the transfer case continuously run while the vehicle is in operation. Although the drive shafts are continuously rotating, an engaging mechanism for the propellor is located aft of the transfer case and before a gearbox to disengage the propellor when not in use.

Further objects, features, and advantages of the present invention over the prior art will become apparent from the detailed description of the drawings which follows, when considered with the attached figures.

BRIEF DESCRIPTION OF THE SEVERAL VIEWS OF THE DRAWING

The objects and features of the invention noted above are explained in more detail with reference to the preferred embodiments illustrated in the attached drawing figures, in which like reference numerals denote like elements, and in which:

FIG. 3 is a top plan view of an amphibious vehicle of FIG. 1, parts broken away and in cross section to show the drive train of the present invention;

FIG. 4 is an enlarged top plan view of the drive train of FIG. 2.

DETAILED DESCRIPTION OF THE INVENTION

Figure 1:
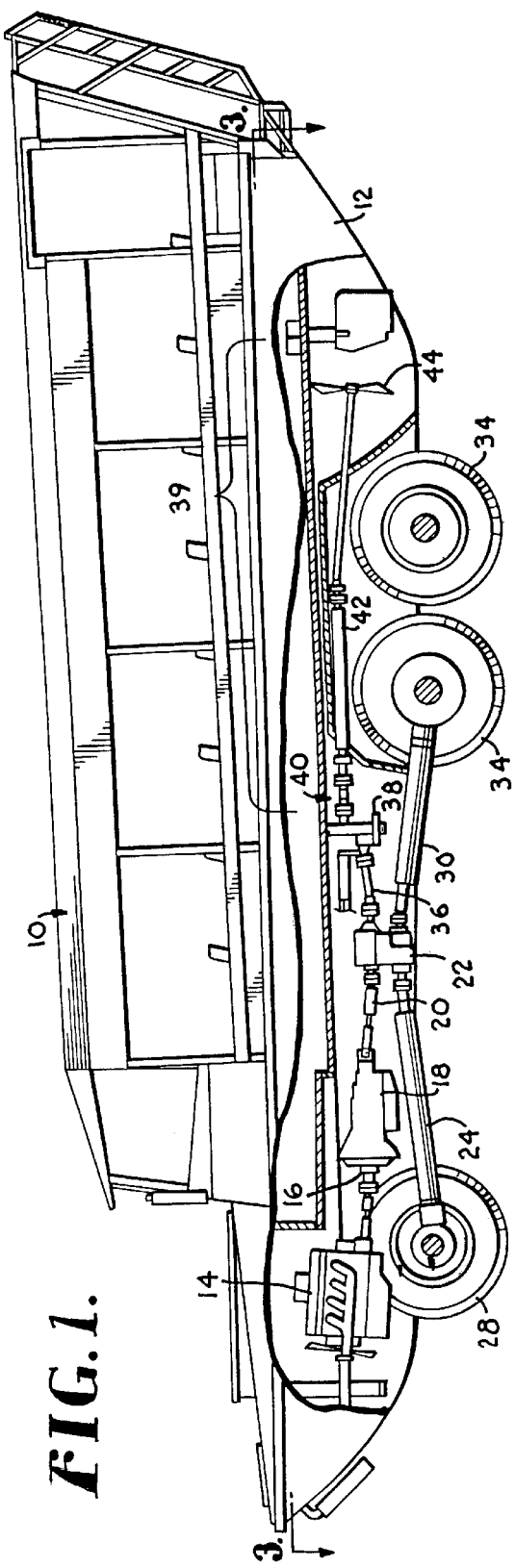
FIG. 1 is a side elevation view of an amphibious vehicle, parts broken away and in cross section to show the drive train of the present invention.

Referring now to the drawings in more detail and initially to FIGS. 1 and 3, numeral generally designates an amphibious vehicle. The amphibious vehicle 10 has a body 12 constructed so that the vehicle 10 has the ability to operate on land and in water. The body 12 has a motor 14 attached to the body 12 in a manner well-known in the art.

The motor is connected to a transmission 18 by a drive shaft 16. The transmission 18 is rotatably coupled to a transfer case 22, by a drive shaft 20. The transfer case is attached to the body and is constructed in a manner well-known in the art. The transfer case 22 has multiple outputs which operate both the land and marine drives.

The body 12 has a set of front and rear wheels, 28 and 34 respectively. The front wheels 28 are rotatably coupled to a front wheel drive shaft 24 in a manner well-known in the art. The rear wheels 34 are rotatably coupled to a rear wheel drive shaft 30 in a manner well-known in the art. The front and rear wheel drive shafts, 24 and 30 are outputs from the transfer case. The transfer case 22 is also rotatably coupled to a gearbox 38 via drive shaft 36. The gearbox drives a propellor system 39. The propellor system 39 consists of a first propellor drive shaft 40, a second propellor drive shaft 42, and a propellor 44.

Figure 2:
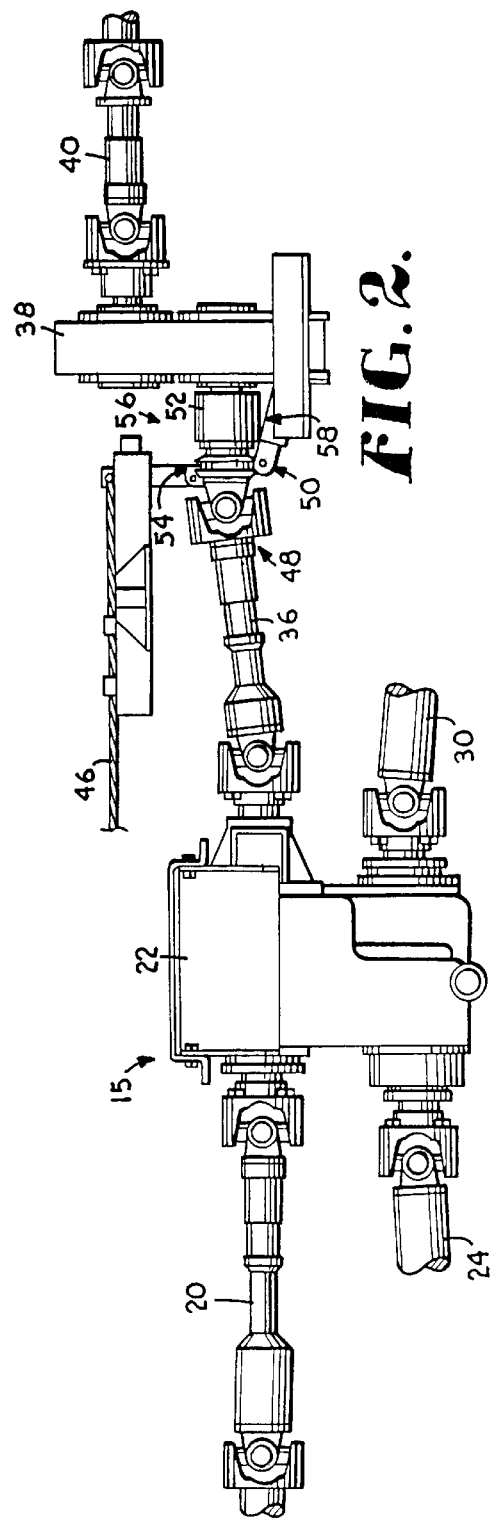
FIG. 2 is an enlarged side elevation view of the drive train of FIG. 1 removed from the amphibious vehicle.

FIGS. 2 and 4 are enlarged views of a drive train 15. The drive train 15 includes the transfer case 22 and a disengaging assembly 48. The transfer case 22 receives the output drive shaft 20 from the transmission. The transfer case has continuously rotating output shafts 24, 30, and 36. The front wheel drive shaft 24 is rotatably coupled to the front wheels in a manner well-known in the art. The rear wheel drive shaft 30 is rotatably coupled to the rear wheels in a manner well-known in the art. The final output drive shaft 36 is rotatably coupled to a disengaging assembly 48 and used to drive the propellor system 39. By locating the disengaging assembly 48 aft of the transfer case, all drive shafts are allowed to run continuously, but the ability to disconnect the propellor system 39 still exists.

The disengaging assembly 48 consists of a cable pull 46, a pivot point 50, a cable attach lever 56, a gear collar 54, and a coupler 52. The disengaging assembly 48 attached to the coupler 52 is the input to the propellor gearbox 38. The gearbox 38 is a speed increasing type. More specifically, it speeds up propellor 44 in a manner such that the speed of the vehicle 10 in water is comparable to the speed the vehicle 10 would be traveling on land with the rotation of the wheels. This allows the vehicle 10 to move from water to land at the same speed allowing a smooth transition for egress. The gearbox 38 is constructed in a manner well-known in the art such that the rotational speed of first propellor drive shaft 40 and thus propellor 44 is greater than the rotational speed of shaft 36. The gear ratio in the gearbox 38 is constructed such that the vehicle travels through the water at approximately the same speed it would travel over land, thus resulting in the smooth transition from water to land. The output from the gearbox 38 is the first propellor drive shaft 40, a part of the propellor system 39. The propellor system is seen in FIGS. 1 and 3. This assembly allows the propellor 44 to be disengaged while the output drive 36 to the propellor system is still rotating.

In operation, the amphibious drive system 15 derives its power from a motor 14. The motor 14 drives the transmission via drive shaft 16. The transmission is then connected to the transfer case 22 by drive shaft 20. The transfer case has multiple output drive shafts which continuously rotate. Drive shafts 24 and 30 drive the front and rear wheels 28 and 34, respectively. Drive shaft 36 is rotatably coupled to disconnect assembly 48 and drives the gearbox 38. The disconnect assembly 48 can be selectively engaged or disengaged to the propellor gearbox 38 in the manner described below.

To engage the propellor 44, the vehicle 10 must be at a complete stop. The T-handle cable 46 is then pulled moving the cable attach lever 56. The cable attach lever 56 moves about the pivot point 50, which is fixed at a bracket 58. The cable attach lever is a J-shaped lever which is attached to the gear collar 54. The vehicle 10 is then allowed to roll forward allowing the drive shaft 36 to rotate at the proper speed and align the teeth for proper engagement. The gear and spline combination is a connection manner well-known in the art. Once aligned and with pressure applied, the gear collar 54 slips into position and the gearbox 38 is then connected to the drive shaft 36. The first propellor drive shaft 40 on the gear box then transmits power to the propellor drive system 39. The disengaging assembly 48 is located aft of the transfer case, but in front of the gearbox 38.

The propellor system 39 can be disengaged from the gearbox 38 by pushing the T-handle attached to cable 46 back to its original position. When the T-handle cable 46 is pushed, the cable attach lever 56 moves the gear collar 54 about a pivot point 50. This movement disengages the gear collar 54 from the coupler 52 attached to the gearbox 38. When the gear collar 54 is disengaged from the coupler 52 the propellor 44 ceases to rotate.

From the foregoing, it will be seen that this invention is one well-adapted to attain all ends and objects hereinabove set forth together with the other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative of applications of the principles of this invention, and not in a limiting sense.

What is claimed is:

1. A drive train for an amphibious vehicle having wheels capable of propelling the vehicle on land and a propellor capable of propelling the vehicle in water, the drive train comprising:

a motor;

a transfer case rotatably coupled with said motor and having at least one wheel drive output and a propellor drive output;

an engaging mechanism located between said transfer case and the propellor, said engaging mechanism allowing a vehicle operator to selectively engage said propel or between a rotating position and a non-rotating position;

a continuously running drive shaft extending from said propellor drive output aft of said transfer case to said engaging mechanism; and a second drive shaft extending from said engaging mechanism for selectively rotating or not rotating said propellor.

2. The drive train of claim 1, further including a third output from said transfer case driving a second set of wheels.

3. The drive train of claim 1, wherein said engagement mechanism is located aft of said transfer case.

4. An amphibious vehicle comprising:

a body;

wheels capable of propelling said vehicle on land;

a propellor capable of propelling said vehicle in water;

a motor;

a transfer case rotatably coupled to said motor and having at least one wheel drive output and a propellor drive output;

an engaging mechanism located between said transfer case and the propellor, said engaging mechanism allowing a vehicle operator to selectively engage said propellor between a rotating position and a non-rotating position;

a continuously running drive shaft extending from said propellor drive output aft of said transfer case to said engaging mechanism; and a second drive shaft extending from said engaging mechanism for selectively rotating or not rotating said propellor.

5. The drive train of claim 4, further including a third output from said transfer case driving a second set of wheels.

6. The drive train of claim 4, wherein said engagement mechanism is located aft of said transfer case.

7. A drive train for an amphibious vehicle, said amphibious vehicle having a motor, a transmission coupled with the motor, a propellor and front and rear axles, the drive train comprising:

a transfer case;

a transmission output drive shaft rotatably coupling said transmission with the transfer case, wherein the transmission output drive shaft provides rotational power to the transfer case from said motor and wherein the transmission output drive shaft is selectively rotatable via said transmission;

a front wheel drive shaft, wherein the front wheel drive shaft rotatably couples the transfer case to said front axle, wherein the front wheel drive shaft is a rotational output from the transfer case, and wherein the front wheel drive shaft provides rotational power to said front axle to propel the amphibious vehicle when on land;

a rear wheel drive shaft, wherein the rear wheel drive shaft rotatably couples the transfer case to said rear axle, wherein the rear wheel drive shaft is a rotational output from the transfer case, and wherein the rear wheel drive shaft provides rotational power to said rear axle to propel the amphibious vehicle when on land; and a propellor output drive shaft, wherein the propellor output drive shaft rotatably couples the transfer case to said propellor, wherein the propellor output drive shaft is a rotational output from the transfer case, and wherein the propellor output drive shaft provides rotational power to said propellor to propel the amphibious vehicle when in water; and wherein the front wheel drive shaft, the rear wheel drive shaft and the propellor output drive shaft are all continuously rotating at all times when the transmission output drive shaft is rotating.

8. The drive train of claim 7, further comprising:

a disengaging assembly, wherein the disengaging assembly is positioned intermediate the transfer case and said propellor, wherein the disengaging assembly is rotatably coupled with the transfer case via the propellor output drive shaft, and wherein the disengaging assembly permits a user to selectively couple said propellor with the propellor output drive shaft.

9. The drive train of claim 8, further comprising:

a propellor gearbox, wherein the propellor gearbox is positioned intermediate the disengaging assembly and said propellor, wherein the propellor gearbox transfers rotational power from the propellor output drive shaft to said propellor when the disengaging assembly is in an engaged position, wherein propellor gearbox has a plurality of mating gears having a gear ratio, and wherein the gear ratio is such that an output of the propellor gearbox rotates faster than the propellor output drive shaft.

10. The drive train of claim 9, wherein gear ratio is such that said propellor propels said amphibious vehicle when in water at approximately a same speed as the front and rear wheel drive shafts propel said amphibious vehicle when on land.

11. The drive train of claim 7, further comprising:

a propellor gearbox, wherein the propellor gearbox is positioned intermediate the propellor output drive shaft and said propellor, wherein the propellor gearbox transfers rotational power from the propellor output drive shaft to said propellor, wherein propellor gearbox has a plurality of mating gears having a gear ratio, and wherein the gear ratio is such that an output of the propellor gearbox rotates faster than the propellor output drive shaft.

12. The drive train of claim 11, wherein gear ratio is such that said propellor propels said amphibious vehicle when in water at approximately a same speed as the front and rear wheel drive shafts propel said amphibious vehicle when on land.

* * * * *